(12) United States Patent
Li et al.

(10) Patent No.: US 10,989,308 B1
(45) Date of Patent: Apr. 27, 2021

(54) SEALING DEVICE WITH CONVERTIBLE MAGNETIC SEALING MEDIUM

(71) Applicant: Tsinghua University, Beijing (CN)

(72) Inventors: Decai Li, Beijing (CN); Zhenghao Li, Beijing (CN)

(73) Assignee: Tsinghua University, Beijing (CN)

( * ) Notice: Subject to any disclaimer, the term of this patent is extended or adjusted under 35 U.S.C. 154(b) by 0 days.

(21) Appl. No.: 17/075,270

(22) Filed: Oct. 20, 2020

(30) Foreign Application Priority Data

Dec. 16, 2019 (CN) .......................... 201911293870.1

(51) Int. Cl.
*F16J 15/43* (2006.01)
*F16C 33/76* (2006.01)

(52) U.S. Cl.
CPC ............. *F16J 15/43* (2013.01); *F16C 33/765* (2013.01)

(58) Field of Classification Search
CPC .................................. F16J 15/43; F16C 33/765
See application file for complete search history.

(56) References Cited

U.S. PATENT DOCUMENTS

| | | | | |
|---|---|---|---|---|
| 3,071,384 A * | 1/1963 | Friberg | .................... | F01D 11/04 277/430 |
| 4,523,741 A * | 6/1985 | Chandler | .................. | F16K 3/26 251/325 |
| 2004/0119240 A1 * | 6/2004 | Hashimoto | ....... | H01J 37/32431 277/432 |
| 2006/0043682 A1 * | 3/2006 | Li | ............................. | F16J 15/43 277/410 |
| 2011/0018255 A1 * | 1/2011 | Takahashi | ............ | F16J 15/3484 285/125.1 |
| 2011/0133869 A1 * | 6/2011 | Yan | ......................... | F16J 15/43 335/205 |
| 2011/0210519 A1 * | 9/2011 | Li | ............................ | F16J 15/43 277/410 |
| 2011/0215532 A1 * | 9/2011 | Li | ............................ | F16J 15/43 277/410 |
| 2011/0215533 A1 * | 9/2011 | Li | ............................ | F16J 15/43 277/410 |
| 2012/0314984 A1 * | 12/2012 | Honda | .................. | F16C 33/765 384/462 |
| 2016/0312899 A1 * | 10/2016 | Shimazaki | ............... | F16J 15/16 |
| 2019/0063613 A1 * | 2/2019 | Sato | ........................ | F16J 15/43 |

* cited by examiner

*Primary Examiner* — Vishal A Patel
(74) *Attorney, Agent, or Firm* — Barley Snyder

(57) ABSTRACT

A sealing device with convertible magnetic sealing medium includes a housing with an accommodation cavity formed therein, a rotary shaft rotatably disposed in the accommodation cavity, a first pole piece disposed on the rotary shaft, a second pole piece fitted over the rotary shaft, and a permanent magnet fitted over the rotary shaft between the first pole piece and the second pole piece. The rotary shaft has a first blind hole, a second blind hole, a first via hole and a second via hole. A plurality of first pole teeth are provided in an inner circumferential wall of the first pole piece and a plurality of second pole teeth are provided in an inner circumferential wall of the second pole piece. Magnetic powder is provided between a top surface of each of the first and second pole tooth and the outer circumferential surface of the rotary shaft.

10 Claims, 3 Drawing Sheets

SEALING DEVICE WITH CONVERTIBLE MAGNETIC SEALING MEDIUM

CROSS-REFERENCE TO RELATED APPLICATION

This application claims the benefit of the filing date under 35 U.S.C. § 119(a)-(d) of Chinese Patent Application No. 201911293870.1, filed on Dec. 16, 2019.

FIELD OF THE INVENTION

The present disclosure relates to the field of sealing techniques in mechanical engineering and, more particularly, to a sealing device with convertible magnetic sealing medium.

BACKGROUND

Magnetic powder is a powder composed of nanoparticles wrapped by surfactants, which exhibits superparamagnetism under a magnetic field. A sealing device with magnetic powder may withstand a large pressure difference and have a high pressure capability, but is not capable of acquiring zero leakage of the sealed object, with zero leakage herein meaning the leaking rate is lower than 10-11 $cm^3$/s. Magnetic fluid is a stable colloid formed by uniformly dispersing nanoparticles wrapped by surfactants into a carrier liquid. A sealing device with magnetic fluid is capable of acquiring zero leakage of the sealing device, but may withstand a relatively small pressure difference. The sealing device in the related art, however, is not capable of switching states of the sealing medium depending on sealing requirements to meet requirements of high pressure resistance or zero leakage.

SUMMARY

A sealing device with convertible magnetic sealing medium includes a housing with an accommodation cavity formed therein, a rotary shaft rotatably disposed in the accommodation cavity, a first pole piece disposed on the rotary shaft, a second pole piece fitted over the rotary shaft, and a permanent magnet fitted over the rotary shaft between the first pole piece and the second pole piece. The rotary shaft has a first blind hole, a second blind hole, a first via hole and a second via hole. A plurality of first pole teeth are provided in an inner circumferential wall of the first pole piece and a plurality of second pole teeth are provided in an inner circumferential wall of the second pole piece. Magnetic powder is provided between a top surface of each of the first and second pole tooth and the outer circumferential surface of the rotary shaft.

BRIEF DESCRIPTION OF THE DRAWINGS

The invention will now be described by way of example with reference to the accompanying Figures, of which.

DETAILED DESCRIPTION OF THE EMBODIMENTS

Figure 1:
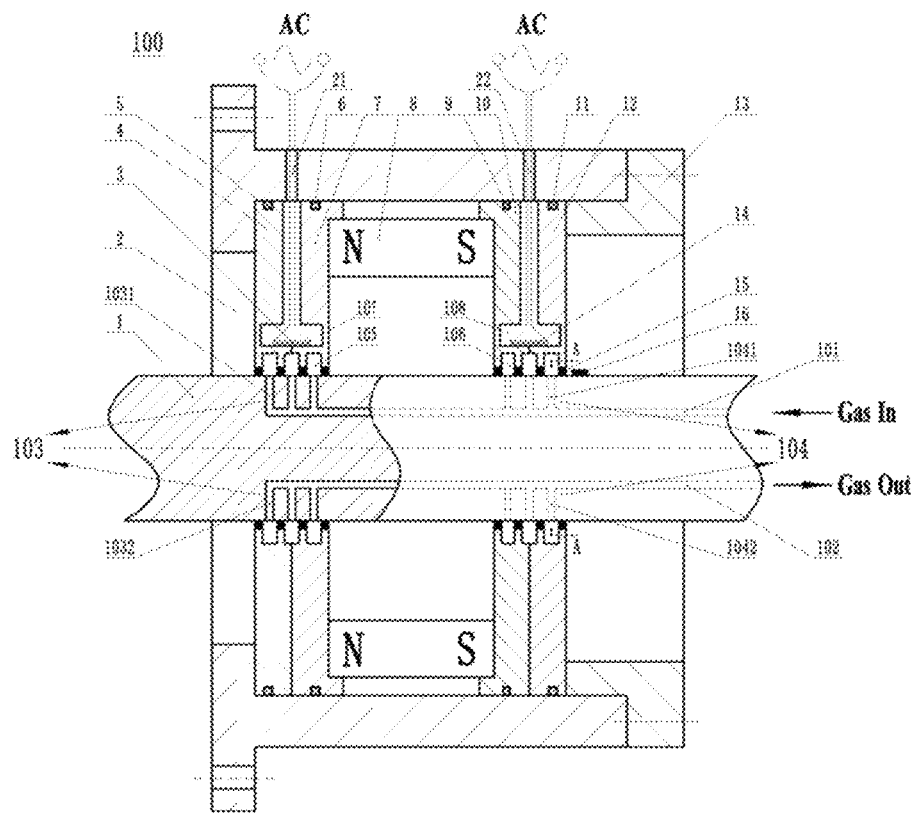
FIG. 1 is a sectional view of a sealing device according to an embodiment.

The embodiments of the disclosure will be described in detail below, and examples of the embodiments will be shown in the drawings, wherein same or like numerals indicate same or like elements or elements with same or like functions. The embodiments described with reference to the drawings are exemplary, which are merely used for explanation of the disclosure, and should not be construed as a limitation to the disclosure.

In the description, it is to be understood terms 'center', 'longitudinal', 'transversal', 'length', 'width', 'thickness', 'upper', 'lower', 'front', 'rear', 'vertical', 'horizontal', 'top', 'bottom', 'inner', 'outer', 'clockwise', 'anti-clockwise', 'axial', 'radial', 'circumferential', etc. indicate an orientation or position relationship which is an orientation or position relationship based on the drawings, and are merely for the convenience of the description of the disclosure and the simplified description, and does not indicate or imply that the indicated device or element must have a specific azimuth and being configured and operated in the specific azimuth, so that it should not be construed as a limitation to the disclosure.

In the description of the specification, description of reference terms 'an embodiment', 'some embodiments', 'exemplary embodiment', 'example', 'specific example', or 'some examples', etc. mean that specific features, structures, materials or characteristics in conjunction with the embodiment or exemplary description in included in at least one embodiment or example of the disclosure. In the specification, the schematic description to the aforementioned terms may not necessarily refer to the same embodiment or example. Further, the described specific features, structures, materials or characteristics may be combined in a suitable manner in any one or more embodiments or examples.

A sealing device with magnetic powder in the related art is not capable of acquiring zero leakage of a sealed substance, and a sealing device with magnetic fluid in not capable of withstanding a large pressure difference. In short, there is not a sealing device capable of switching the sealing medium between two states to meet the requirements of zero leakage and high pressure capability.

Some embodiments of the disclosure present a sealing device with convertible magnetic sealing medium, the sealing device with convertible magnetic sealing medium is capable of acquiring zero leakage of the sealed substance and may withstand a large pressure difference, and the sealing device is capable of switching the sealing medium between two states, so that the requirements of zero leakage and high pressure capability are achieved. For example, the sealing device of the embodiments of the disclosure may be used for the sealing at the stirring shaft of a chemical reactor: in the state of magnetic powder, the sealing of high pressure reaction is realized; in the state of magnetic fluid, zero leakage of the substance in the reactor is realized. The reactor may therefore meet the reaction conditions of various products. Besides, the sealing device of the embodiments of the disclosure may further be used for the sealing at the rotary shaft of a compressor: in the state of magnetic fluid, isolation of the inner environment and the outer environment of the compressor is realized, and the pollution is prevented, so that a long-term storage is achieved; when working is required, magnetic fluid is converted into the state of magnetic powder, and the pressure capability is high, so that the working condition of the compressor compressing air is met.

Figure 2:
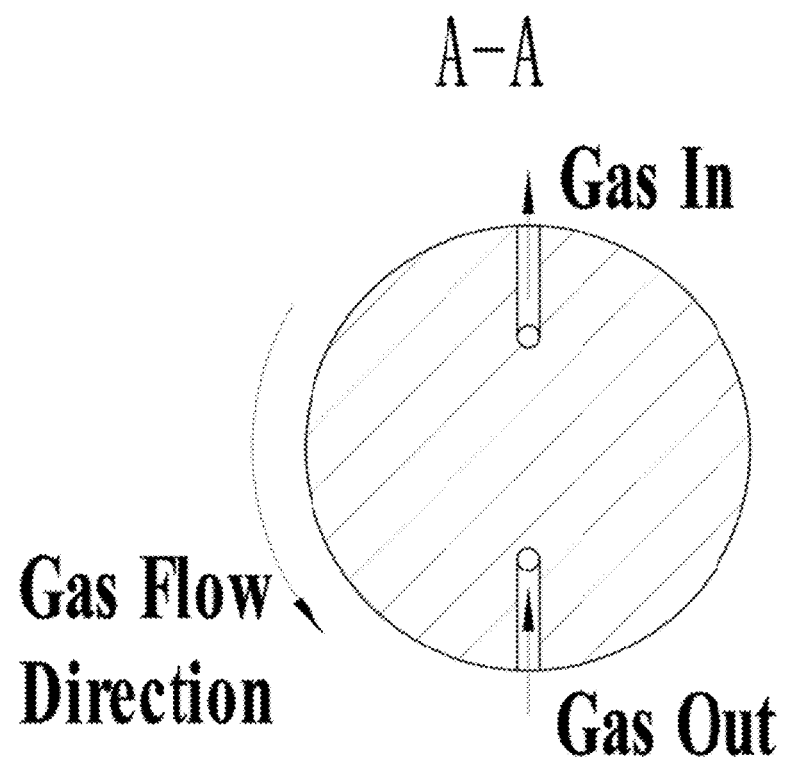
FIG. 2 is a sectional view of a rotary shaft of the sealing device, taken along line A-A in FIG. 1.

A sealing device 100 with a convertible magnetic sealing medium according to an embodiment is shown in FIGS. 1 and 2. The sealing device 100 includes a housing 2, a rotary shaft 1, a first pole piece, a second pole piece, a permanent magnet 8, an end cover 13 and a temperature sensor 16.

An accommodation cavity is formed in the housing 2, and two ends of the accommodation cavity are an inner end and an outer end, respectively. The rotary shaft 1 is rotatably disposed in the accommodation cavity, and the rotary shaft 1 extends from the outer end of the accommodation cavity into the inner end of the accommodation cavity. For example, the rotary shaft 1 may extends from the right end of the accommodation cavity in FIG. 1 into the left end of the accommodation cavity in FIG. 1.

As shown in FIG. 1, a first blind hole 101 and a second blind hole 102 which both axially extend are disposed in the rotary shaft 1. A first via hole 103 and a second via hole 104 which both radially extend are disposed in the rotary shaft 1, the first via hole 103 is in communication with the first blind hole 101, and the second via hole 104 is in communication with the second blind hole 102. For example, the first blind hole 101 and the second blind hole 102 may be disposed in the rotary shaft 1, both the first blind hole 101 and the second blind hole 102 may extend in an axial direction of the rotary shaft 1. The first via hole 103 and the second via hole 104 may be disposed in the rotary shaft 1, both the first via hole 103 and the second via hole 104 may extend in a radial direction of the rotary shaft 1. The first via hole 103 may be in communication with the first blind hole 101 and the second via hole 104 may be in communication with the second blind hole 102.

In some optional embodiments of the disclosure, there may be a plurality of the first via holes 103 and a plurality of the second via holes 104. In an embodiment, in the circumferential direction of the rotary shaft 1, there may be two first via holes 103, with the two first via holes 103 separated by 180 degrees, and there may be two second via holes 104, with the two second via holes 104 separated by 180 degrees.

For example, in some embodiments, in the circumferential direction of the rotary shaft 1, there may be two first via holes 103, one of which is a first inflow via hole 1031, the other one of which is a first outflow via hole 1032, the first inflow via hole 1031 and the first outflow via hole 1032 may be separated by 180 degrees, and a line connecting a center line of the first inflow via hole 1031 with a center line of the first outflow via hole 1032 may be in the direction of the diameter of the rotary shaft 1. FIG. 1 shows the first inflow via hole 1031 and the first outflow via hole 1032 are disposed in the circumferential direction of the rotary shaft 1, and the first inflow via hole 1031 and the first outflow via hole 1032 are opposite to each other in the direction of the diameter of the rotary shaft 1.

As shown in FIG. 1, in the circumferential direction of the rotary shaft 1, there may be two second via holes 104, and the two second via holes 104 are separated by 180 degrees. For example, in some embodiments, in the circumferential direction of the rotary shaft 1, there may be two second via holes 104, one of which is a second inflow via hole 1041, the other one of which is a second outflow via hole 1042. The second inflow via hole 1041 and the second outflow via hole 1042 may be separated by 180 degrees, and a line connecting a center line of the second inflow via hole 1041 with a center line of the second outflow via hole 1042 may be in the direction of the diameter of the rotary shaft 1. FIG. 1 shows that the second inflow via hole 1041 and the second outflow via hole 1042 are disposed in the circumferential direction of the rotary shaft 1, and the second inflow via hole 1041 and the second outflow via hole 1042 are opposite to each other in the direction of the diameter of the rotary shaft 1.

The first pole piece is fitted over the outside of the rotary shaft 1, and the inner peripheral wall of the first pole piece is provided with a plurality of first pole teeth. Magnetic powder 15 is provided between the top surface of each first pole tooth and the outer circumference of the rotary shaft 1. A first cavity 105 is defined between two adjacent first pole teeth, and the first cavity 105 and the first via hole 103 are disposed opposite to each other in the radial direction of the rotary shaft 1.

For example, the first pole piece may be fitted over an outer side of the rotary shaft 1, and a plurality of first pole teeth are disposed in an inner circumferential wall of the first pole piece. In the description of the disclosure, an expression "a plurality of" means the number is greater than or equal to two. The sealing medium is provided between a top surface of each first pole tooth and the outer circumference of the rotary shaft 1. The sealing medium may be, for example, magnetic powder 15 for sealing. The magnetic powder 15 may be provided in a gap between the first pole piece and the rotary shaft 1. The first cavity 105 is defined between two adjacent first pole teeth, and the first cavity 105 and the first via hole 103 may be disposed opposite to each other in the radial direction of the rotary shaft 1.

The second pole piece is fitted over the outer side of the rotary shaft 1, and is disposed apart from the first pole piece in the axial direction of the rotary shaft 1. A plurality of second pole teeth are disposed in an inner circumferential wall of the second pole piece, and the magnetic powder 15 for sealing is provided between a top surface of each second pole tooth and the outer circumference of the rotary shaft 1. A second cavity 106 is defined between two adjacent second pole teeth, and the second cavity 106 and the second via hole 104 are disposed opposite to each other in the radial direction of the rotary shaft 1.

For example, the second pole piece may be fitted over the outer side of the rotary shaft 1, and the second pole piece and the first pole piece may be disposed apart in the axial direction of the rotary shaft 1, the second pole piece may be located on the right side of the first pole piece, and a plurality of second pole teeth are disposed in the inner circumferential wall of the first pole piece. The sealing medium is provided between the top surface of each second pole tooth and the outer circumference of the rotary shaft 1. The sealing medium may be, for example, magnetic powder 15 for sealing. The magnetic powder 15 may be provided in a gap between the second pole piece and the rotary shaft 1. The second cavity 106 is defined between two adjacent second pole teeth, and the second cavity 106 and the second via hole 104 may be disposed opposite to each other in the radial direction of the rotary shaft 1.

A permanent magnet 8 is fitted over the rotary shaft 1, as shown in FIG. 1, and is located between the first pole piece and the second pole piece. For example, the permanent magnet 8 may be fitted over the rotary shaft 1, and the permanent magnet 8 may be located between the first pole piece and the second pole piece, a left end of the permanent magnet 8 may abut against a right side surface of the first pole piece, and a right end of the permanent magnet 8 may abut against a left side surface of the second pole piece.

An end cover 13 is located on a side of the second pole piece away from the first pole piece, as shown in FIG. 1, and a position of the end cover 13 is fixed relative to the housing 2. For example, the end cover 13 may be located on the right side of the second pole piece, and the position of the end cover 13 is fixed relative to the housing 2. Thereby, a cooperation of the end cover 13 and the housing 2 facilitates an axial positioning of various components in the housing 2.

According to some embodiments of the disclosure, the sealing device 100 with convertible magnetic sealing medium may further comprise a temperature sensor 16, the temperature sensor 16 may be disposed on the rotary shaft 1, and the temperature sensor 16 may be disposed adjacent to the magnetic powder 15 so as to monitor the temperature around the sealing gap. For example, in some embodiments of the disclosure, the temperature sensor 16 may be disposed on the right side of the second pole piece as shown in FIG. 1, however, the disclosure is not limited to this.

In the embodiment shown in FIG. 1, the first pole piece includes a first left half pole piece 4 and a second left half pole piece 7. The first left half pole piece 4 is in a sealed connection with the housing 2. The second left half pole piece 7 is located on a side of the first left half pole piece 4 adjacent to the second pole piece, for example, the second left half pole piece 7 may be located on the right side of the first left half pole piece 4, and the second left half pole piece 7 is in a sealed connection with the housing 2. The first left half pole piece 4 and the second left half pole piece 7 are connected with each other. A first room 107 is defined between the first left half pole piece 4 and the second left half pole piece 7, and a first resistance wire 3 is provided in the first room 107.

In the embodiment shown in FIG. 1, the second pole piece includes a first right half pole piece 10 and a second right half pole piece 12. The first right half pole piece 10 is in a sealed connection with the housing 2. The second right half pole piece 12 is located on a side of the first right half pole piece 10 away from the first pole piece, for example, the second right half pole piece 12 may be located on the right side of the first right half pole piece 10, and the second right half pole piece 12 is in a sealed connection with the housing 2. The first right half pole piece 10 and the second right half pole piece 12 are connected with each other. A second room 108 is defined between the first right half pole piece 10 and the second right half pole piece 12, and a second resistance wire 14 is provided in the second room 108.

A first through hole 21 and a second through hole 22 are provided in the housing 2, as shown in FIG. 1. The first through hole 21 is in communication with the first room 107 so as to allow a conductive line of the first resistance wire 3 pass therethrough, and the second through hole 22 is in communication with the second room 108 so as to allow a conductive line of the second resistance wire 14 pass therethrough.

Figure 3:
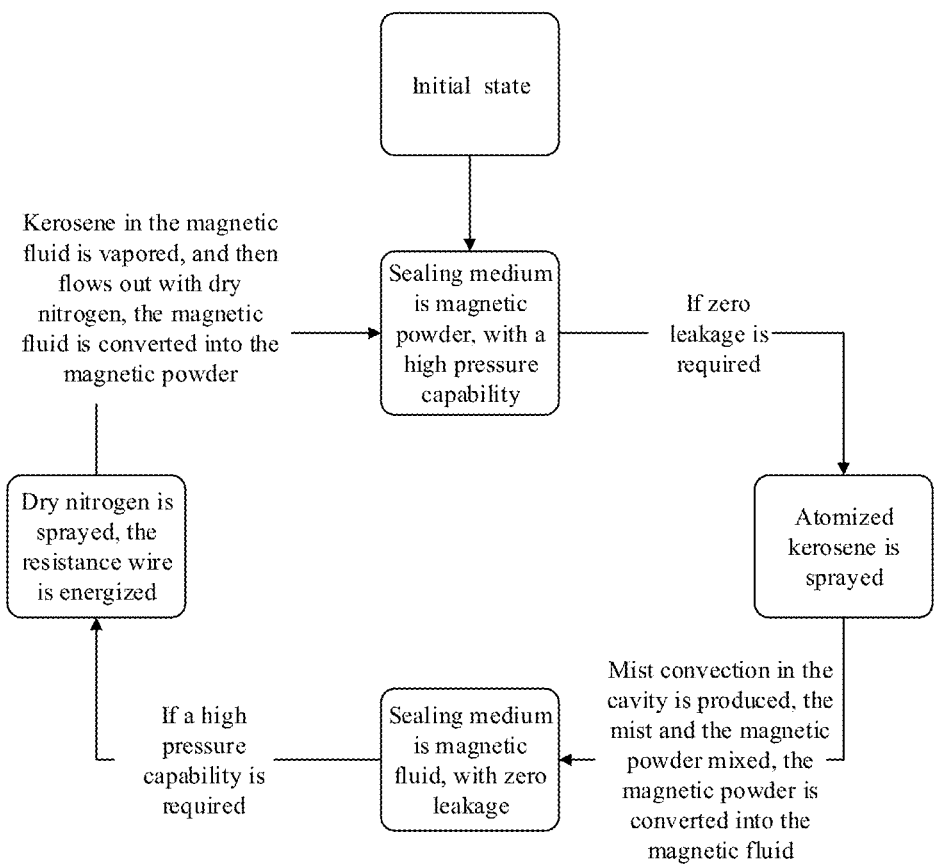
FIG. 3 is an operating diagram of the sealing device of FIG. 1.

With reference to FIGS. 1-3, when the sealing device 100 with convertible magnetic sealing medium is operating, atomized kerosene is sprayed into the first blind hole 101 of the rotary shaft 1 if zero leakage in the sealing device 100 is required. As shown in FIG. 1, the atomized kerosene flows into and fills the first cavity 105 and the second cavity 106 between the pole teeth (for example, between the first pole tooth and the second pole tooth) through the first inflow via hole 1031 and the second inflow via hole 1041 on one side of the diametric direction of the rotary shaft 1. As shown in FIG. 1, in the process of the atomized kerosene filling the first cavity 105 and the second cavity 106, the atomized kerosene in the first cavity 105 and the second cavity 106 may flow out through the first outflow via hole 1032 and the second outflow via hole 1042 on the opposite side of the diametric direction of the rotary shaft 1, and may further flow out through the second blind hole 102 of the rotary shaft 1. As the rotary shaft 1 rotates and the atomized kerosene is continuously sprayed, the convection of the mist in the cavity (including the first cavity 105 and the second cavity 106) may be produced, then the mist and the magnetic powder 15 are fully mixed to form magnetic fluid in situ, thus zero leakage of the sealing device 100 is achieved.

If the magnetic powder 15 in the sealing device 100 has been converted into the magnetic fluid and the sealing device 100 requires a high pressure capability, dry nitrogen is sprayed into the first blind hole 101 of the rotary shaft 1, and the temperature around the sealing gap is monitored by the temperature sensor 16. The AC power supply is turned on to energize the first resistance wire 3 and the second resistance wire 14, so that the temperature around the sealing gap reaches a predetermined temperature (such as 350° C., etc.). Then the kerosene in the magnetic liquid evaporates, and flows out from the second blind hole 102 of the rotary shaft 1 with the flowing dry nitrogen, so that the magnetic liquid is converted into the magnetic powder, thereby realizing the high pressure capability. The sealing device 100 with convertible magnetic sealing medium according to the embodiments of the disclosure may achieve zero leakage of the sealed substance, and it may withstand a large pressure difference, that is, the sealing device described in the disclosure may convert the sealing medium in the above two states, so as to meet the requirements of zero leakage and high pressure capability.

As shown in FIG. 1, a first left pole piece sealing ring 5 is provided between the first left half pole piece 4 and the housing 2, and a second left pole piece sealing ring 6 is provided between the second left half pole piece 7 and the housing 2. A first right pole piece sealing ring 9 is provided between the first right half pole piece 10 and the housing 2, and a second right pole piece sealing ring 11 is provided between the second right half pole piece 12 and the housing 2.

For example, the first left pole piece sealing ring 5 is embedded into a sealing slot of the first left half pole piece 4, thereby forming the first left half pole piece with the sealing ring. The second left pole piece sealing ring 6 is embedded into a sealing slot of the second left half pole piece 7, thereby forming the second left half pole piece with the sealing ring. The first right pole piece sealing ring 9 is embedded into a sealing slot of the first right half pole piece 10, thereby forming the first right half pole piece with the sealing ring. The second right pole piece sealing ring 11 is embedded into a sealing slot of the second right half pole piece 12, thereby forming the second right half pole piece with the sealing ring. Whereby, it is beneficial to avoid axial movement of the sealing rings, thereby the sealing effect is further ensured. Here, the material, shape, and sealing grade of the sealing rings may be selected depending on actual needs, and the disclosure does not specifically limit this.

As shown in FIG. 1, a first left half recess is formed on a side of the first left half pole piece 4 close to the second left half pole piece 7, a second left half recess is formed on a side of the second left half pole piece 7 close to the first left half pole piece 4, and the first left half pole piece 4 and the second left half pole piece 7 are adhesively connected, so as to define the first room 107 between the first left half pole piece 4 and the second half pole piece 7. For example, as shown in FIG. 1, the first left half recess is formed on the right side of the first left half pole piece 4, the second left half recess is formed on the left side of the second left half pole piece 7, and the first left half pole piece 4 and the second left half pole piece 7 are adhesively connected. In this way, the first left half recess and the second left half recess may cooperate to define the first room 107 between the first left half pole piece 4 and the second half pole piece 7.

A first right half recess is formed on a side of the first right half pole piece 10 close to the second right half pole piece 12, a second right half recess is formed on a side of the second right half pole piece 12 close to the first right half pole piece 10, and the first right half pole piece 10 and the second right half pole piece 12 are adhesively connected, so as to define the second room between the first right half pole piece 10 and the second right pole piece 12. For example, with reference to FIG. 1, the first right half recess is formed on the right side of the first right half pole piece 10, the second right half recess is formed on the left side of the second right half pole piece 12, and the first right half pole piece 10 and the second right half pole piece 12 are adhesively connected. In this way, the first right half recess and the second right half recess may cooperate to define the second room 108 between the first right half pole piece 10 and the second right pole piece 12.

In some embodiments of the disclosure, the first left half pole piece 4 with the sealing ring 5 is mounted in the housing 2, and an inner right side surface of the housing 2 is in contact with a left side surface of the first left half pole piece 4 with the sealing ring 5. The conductive line of the first resistance wire 3 passes through the first through hole 21 in the housing 2, and two ends of the resistance wire 3 are connected to an AC power supply. The second left half pole piece 7 with the sealing ring 6 is adhered to the right side of the first left half pole piece 4 with the sealing ring 5, and the first resistance wire 3 is located in the first room 107 formed by the first left half pole piece 4 and the second left half pole piece 7. The permanent magnet 8 is mounted on the second left half pole piece 7. The first right half pole piece 10 with the sealing ring 9 is mounted on the permanent magnet 8. The conductive line of the second resistance wire 14 passes through the second through hole 22 in the housing 2, and two ends of the second resistance wire 14 are connected to the AC power supply. The second right half pole piece 12 with the sealing ring 11 is adhered to the right side of the first right half pole piece 10 with the sealing ring 11, and the second resistance wire 14 is located in the second room 108 formed by the first right half pole piece 10 and the second right half pole piece 12.

According to some embodiments of the disclosure, the end cover 13 is in a threaded connection with the housing 2. Whereby, the assembly and disassembly of the end cover 13 and the housing 2 may be easily achieved, and it is beneficial to achieve the axial positioning of the various components in the housing 2. Of course, in some optional embodiments of the disclosure, the end cover 13 and the housing 2 may also be connected via other connection methods, such as a plug-in connection. The disclosure does not limit the specific connecting manner of the end cover 13 and the housing 2, which may be adjusted adaptively according to the requirements in the actual applications.

As shown in FIG. 1, according to some embodiments of the disclosure, in the axial direction of the rotary shaft 1, one first via hole 103 or a plurality of first via holes 103 (which are apart from one another) are provided. For example, in some embodiments, in the axial direction (for example, the left-right direction in FIG. 1) of the rotary shaft 1, one first via hole 103 or a plurality of first via holes 103 (which are apart from one another) are provided. FIG. 1 shows that three first via holes 103 are provided in the axial direction of the rotary shaft 1, and the three first via holes 103 are apart from one another.

In the axial direction of the rotary shaft 1, one second via hole 104 or a plurality of second via holes 104 (which are apart from one another) are provided. For example, in some embodiments, in the axial direction (for example, the left-right direction in FIG. 1) of the rotary shaft 1, one second via hole 104 or a plurality of second via holes 104 (which are apart from one another) are provided. FIG. 1 shows that three second via holes 104 are provided in the axial direction of the rotary shaft 1, and the second via holes 104 are apart from one another.

For example, in some specific embodiments of the disclosure, six first via holes 103 and six second via holes 104 are provided, however, the disclosure is not limited to this. Here, it should be noted that, the description to the number and the arrangement of the first via hole 103 and the second via hole 104 are merely illustrative, but should not be considered as a limitation to the disclosure.

Two first via holes 103 may correspond to one first cavity 105, and the first inflow via hole 1031 and the first out flow via hole 1032 are in communication with the first cavity 105, respectively. Two second via holes 104 may correspond to one second cavity 106, and the second inflow via hole 1041 and the second outflow via hole 1042 are in communication with the second cavity 106, respectively. In this way, the cavities (for example, the first cavity 105 and the second cavity 106) between the pole teeth (for example, the first pole tooth and the second pole tooth) may communicate with the blind holes (for example, the first blind hole 101 and the second blind hole 102) in the rotary shaft 1. The first cavity 105 may communicate with the first blind hole 101, and the second cavity 106 may communicate with the second blind hole 102.

Both the first via hole 103 and the second via hole 104 are configured to be circular holes, and the diameter of each of the first via hole 103 and the second via hole 104 is 5 mm in an embodiment.

In some optional embodiments of the present disclosure, the permanent magnet 8 is made of one of neodymium iron boron, samarium cobalt, and iron cobalt nickel. It should be understood that neodymium-iron-boron is selected for the permanent magnet 8 under the sealed condition of normal temperature, samarium cobalt is selected for the permanent magnet 8 when the temperature is below 300° C., and iron cobalt nickel is selected for the permanent magnet 8 when the temperature is at 400° C. Therefore, different permanent magnets 8 are selected under different sealing temperature conditions, and it is beneficial to broaden the application range of the sealing device 100 according to the embodiments of the disclosure.

According to some embodiments of the disclosure, the housing 2 and the end cover 13 are made of non-magnetic material. By way of example and non-limitation, the housing 2 and the end cover 13 may be made of stainless-steel materials.

According to some embodiments of the present disclosure, the magnetic powder 15 may be $Fe_3O_4$ nanoparticles coated with oleic acid.

In some embodiments of the disclosure, the first left half pole piece 4, the second left half pole piece 7, the first right half pole piece 10, the second right half pole piece 12 and the rotary shaft 1 are made of magnetically conductive materials. For example, in some embodiments of the disclosure, the first left half pole piece 4, the second left half pole piece 7, the first right half pole piece 10, the second right half pole piece 12 and the rotary shaft 1 may be made of materials of a good magnetic permeability, such as electrical pure iron. Of course, in other embodiments of the disclosure, the materials of the first left half pole piece 4, the second left half pole piece 7, the first right half pole piece 10, the second right half pole piece 12 and the rotary shaft 1 may be selected depending on the actual condition, and are not limited to electrical pure iron, which is understandable to those skilled in the art.

In some embodiments of the disclosure, the first resistance wire 3 and the second resistance wire 14 may select a 0Gr25Al5 material.

Other configurations and operations of the sealing device 100 with convertible magnetic sealing medium according to the embodiments of the disclosure are well known for those skilled in the art, which will not be described in detail herein.

In the sealing device 100 with convertible magnetic sealing medium according to the embodiments of the disclosure, an upper blind hole and a lower blind hole, that is, the first blind hole 101 and the second blind hole 102, are provided in the rotary shaft 1, wherein the first blind hole 101 is in communication with the first cavity 105 between two adjacent first pole teeth, and the second blind hole 102 is in communication with the second cavity 106 between two adjacent second pole teeth. The first room 107 is formed between the first left half pole piece 4 and the second left half pole piece 7, the first resistance wire 3 is provided in the first room 107; the second room 108 is formed between the first right half pole piece 10 and the second right half pole piece 12, and the second resistance wire 3 is provided in the second room 108.

Magnetic powder 15 is injected at each pole tooth (for example, the gap between the top surface of the pole tooth and the rotary shaft 1), so that the sealing device 100 has a high pressure capability in this case.

When the sealing device 100 requires zero leakage, atomized kerosene is sprayed from the first blind hole 101 of the rotary shaft 1, the atomized kerosene fills the cavity (for example, the first cavity 105 and the second cavity 106) between the pole teeth (for example, the first pole teeth and the second pole teeth) and flows out from the second blind hole 102 of the rotary shaft 1. The rotary shaft 1 rotates to produce the mist convection in the cavity, and the mist and the magnetic powder 15 are fully mixed so that the magnetic powder 15 is converted into the magnetic fluid, thus zero leakage is achieved.

If the sealing device 100 requires a high pressure capability, dry nitrogen is sprayed from the first blind hole 101 of the rotary shaft 1, and the resistance wire (for example, the first resistance wire 3 and the second resistance wire 14) is energized. Kerosene in the magnetic fluid is vaporized, and the magnetic fluid is converted back into the magnetic powder 15, thus the high pressure capability is achieved.

The sealing device 100 with convertible magnetic sealing medium according to the embodiments of the disclosure may switch between two states of magnetic powder and magnetic fluid, thereby fulfill the requirements of the high pressure capability and zero leakage, respectively.

The disclosure has the following beneficial effects relative to the related art: the sealing device 100 with convertible magnetic sealing medium according to the embodiments of the disclosure has a stronger sealing adaptability and may be applied to different sealing requirements, that is, high pressure capability and zero leakage. The operation is simple, by controlling the inflow of gas and controlling the on-off state of the AC power supply, the switch between the two sealing states may be realized.

In the embodiments of the present disclosure, the sealing medium of the sealing device 100 may be converted between the magnetic powder and the magnetic fluid. Correspondingly, the sealing device 100 is a combined sealing device with magnetic powder and magnetic fluid.

Although the embodiments of the disclosure have been shown and described, those of ordinary skill in the art may understand that various changes, modifications, substitutions and variations may be made to these embodiments without departing from the principles and intention of the present disclosure. The scope of the present disclosure shall be defined by the claims and their equivalents.

What is claimed is:

1. A combined sealing device with magnetic powder and magnetic fluid, comprising:

a housing having an accommodation cavity formed in the housing, a pair of ends of the accommodation cavity are an inner end and an outer end;

a rotary shaft rotatably disposed in the accommodation cavity, the rotary shaft extends from the outer end of the accommodation cavity to the inner end of the accommodation cavity, a first blind hole and a second blind hole are provided in the rotary shaft and extend in an axial direction of the rotary shaft, a pair of first via holes and a pair of second via holes are provided in the rotary shaft and extend in a radial direction of the rotary shaft, the first via holes are separated by 180 degrees in a circumferential direction of the rotary shaft, the second via holes are separated by 180 degrees in the circumferential direction of the rotary shaft, one of the first via holes is in communication with the first blind hole and the other of the first via holes is in communication with the second blind hole, one of the second via holes is in communication with the first blind hole and the other one of the second via holes is in communication with the second blind hole;

a first pole piece fitted over an outer side of the rotary shaft, a plurality of first pole teeth are provided in an inner circumferential wall of the first pole piece, a magnetic powder is provided between a top surface of each first pole tooth and an outer circumferential surface of the rotary shaft, a first cavity is defined between two adjacent first pole teeth, the first cavity and the first via hole are opposite to each other in a diametric direction of the rotary shaft;

a second pole piece fitted over the outer side of the rotary shaft and disposed apart from the first pole piece in the axial direction of the rotary shaft, a plurality of second pole teeth are provided in an inner circumferential wall of the second pole piece, the magnetic powder is provided between a top surface of each second pole tooth and the outer circumferential surface of the rotary shaft, a second cavity is defined between two adjacent second pole teeth, the second cavity and the second via hole are opposite to each other in the diametric direction of the rotary shaft;

a permanent magnet fitted over the rotary shaft and located between the first pole piece and the second pole piece;

an end cover located on a side of the second pole piece away from the first pole piece, a position of the end cover is fixed relative to the housing;

a temperature sensor disposed on the rotary shaft adjacent to the magnetic powder so as to monitor a temperature around a sealing gap;

the first pole piece includes a first left half pole piece in a sealed connection with the housing and a second left half pole piece, the second left half pole piece is located on a side of the first left half pole piece close to the second pole piece, the second left half pole piece is in a sealed connection with the housing, the first left half pole piece and the second left half pole piece are connected, a first room is defined between the first left half pole piece and the second left half pole piece, a first resistance wire is provided in the first room;

the second pole piece includes a first right half pole piece in a sealed connection with the housing and a second right half pole piece, the second right half pole piece is on a side of the first right half pole piece away from the first pole piece, the second right half pole piece is in a sealed connection with the housing, the first right half pole piece and the second right half pole piece are connected, a second room is defined between the first right half pole piece and the second right half pole piece, a second resistance wire is provided in the second room; and the housing has a first through hole and a second through hole, the first through hole is in communication with the first room so as to allow a conductive line of the first resistance wire to pass therethrough, and the second through hole is in communication with the second room so as to allow a conductive line of the second resistance wire to pass therethrough.

2. The combined sealing device with magnetic powder and magnetic fluid according to claim 1, wherein a first left pole piece sealing ring is provided between the first left half pole piece and the housing, a second left pole piece sealing ring is provided between the second left half pole piece and the housing; and a first right pole piece sealing ring is provided between the first right half pole piece and the housing, and a second right pole piece sealing ring is provided between the second right half pole piece and the housing.

3. The combined sealing device with magnetic powder and magnetic fluid according to claim 1, wherein a first left half recess is formed on a side of the first left half pole piece close to the second left half pole piece, a second left half recess is formed on a side of the second left half pole piece close to the first left half pole piece, and the first left half pole piece and the second left half pole piece are adhesively connected, the first room is defined between the first left half pole piece and the second left half pole piece; and a first right half recess is formed on a side of the first right half pole piece close to the second right half pole piece, a second right half recess is formed on a side of the second right half pole piece close to the first right half pole piece, and the first right half pole piece and the second right half pole piece are adhesively connected, the second room is defined between the first right half pole piece and the second right half pole piece.

4. The combined sealing device with magnetic powder and magnetic fluid according to claim 1, wherein the end cover is in a threaded connection with the housing.

5. The combined sealing device with magnetic powder and magnetic fluid according to claim 1, wherein there is one first via hole or a plurality of first via holes which are disposed apart from one another in the axial direction of the rotary shaft, and there is one second via hole or a plurality of second via holes which are disposed apart from one another in the axial direction of the rotary shaft, both the first via holes and the second via holes are circular, and a diameter of each of the first via holes and the second via holes is 5 mm.

6. The combined sealing device with magnetic powder and magnetic fluid according to claim 1, wherein the permanent magnet is made of one of the following materials: neodymium iron boron, samarium cobalt, and iron cobalt nickel.

7. The combined sealing device with magnetic powder and magnetic fluid according to claim 1, wherein the housing and the end cover are made of non-magnetic materials.

8. The combined sealing device with magnetic powder and magnetic fluid according to claim 1, wherein the magnetic powder is $Fe_3O_4$ nanoparticles coated with oleic acid.

9. The combined sealing device with magnetic powder and magnetic fluid according to claim 1, wherein the first left half pole piece, the second left half pole piece, the first right half pole piece, the second right half pole piece, and the rotary shaft are made of magnetic materials.

10. The combined sealing device with magnetic powder and magnetic fluid according to claim 1, wherein the first resistance wire and the second resistance wire are made of 0Gr25Al5.

* * * * *